United States Patent
Nayebi et al.

(10) Patent No.: US 11,411,403 B2
(45) Date of Patent: Aug. 9, 2022

(54) CONTROLLING POWER DISTRIBUTION AT DEADBAND STATES

(71) Applicant: VESTAS WIND SYSTEMS A/S, Aarhus N (DK)

(72) Inventors: Kouroush Nayebi, Ikast (DK); Søren Kappelgaard, Århus N (DK); Thair Mahmoud, Hoppers Crossing (AU)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/373,288

(22) Filed: Jul. 12, 2021

(65) Prior Publication Data
US 2022/0190601 A1    Jun. 16, 2022

(30) Foreign Application Priority Data

Dec. 14, 2020   (DK) ............................ PA 2020 70829

(51) Int. Cl.
*H02J 3/24*      (2006.01)
*G05B 13/02*     (2006.01)
(Continued)

(52) U.S. Cl.
CPC .............. *H02J 3/24* (2013.01); *G05B 13/024* (2013.01); *H02J 3/381* (2013.01); *H02J 13/00002* (2020.01); *H02J 2300/28* (2020.01)

(58) Field of Classification Search
None
See application file for complete search history.

(56) References Cited

U.S. PATENT DOCUMENTS

| | | | | |
|---|---|---|---|---|
| 4,246,491 A | * | 1/1981 | Waldron | F01D 17/24 |
| | | | | 290/40 R |
| 4,426,192 A | * | 1/1984 | Chertok | F03D 7/043 |
| | | | | 416/41 |

(Continued)

FOREIGN PATENT DOCUMENTS

| | | | | |
|---|---|---|---|---|
| CN | 101860042 A | * | 10/2010 | ............... H02J 3/38 |
| CN | 107810322 B | * | 7/2019 | ........... G05B 19/042 |

(Continued)

OTHER PUBLICATIONS

Danish Patent and Trademark Office First Technical Examination for Application No. PA 202070829 dated May 10, 2021.

(Continued)

*Primary Examiner* — Mohammad Ali
*Assistant Examiner* — Kelvin Booker
(74) *Attorney, Agent, or Firm* — Patterson + Sheridan, LLP

(57) ABSTRACT

Aspects of the present invention relate to a method for controlling one or more wind turbine generators. The method comprises: monitoring an electrical parameter of a power network to which the wind turbine generators are connected with respect to a deadband for the electrical parameter; and determining that the monitored electrical parameter is deviating outside of the deadband. In response to determining that the electrical parameter is deviating outside of the deadband, the method comprises: quantifying a severity of the deviation; and selectively implementing a parameter control mode when the quantified severity of the deviation is at or above a threshold level. In the parameter control mode, one or more power set points are determined based on the value of the electrical parameter and are dispatched to control the wind turbine generators.

13 Claims, 4 Drawing Sheets

(51) Int. Cl.
*H02J 3/38* (2006.01)
*H02J 13/00* (2006.01)

(56) References Cited

U.S. PATENT DOCUMENTS

| | | | | |
|---|---|---|---|---|
| 2009/0194995 | A1* | 8/2009 | Delmerico | H02P 9/04 290/44 |
| 2011/0001318 | A1 | 1/2011 | Nelson | |
| 2011/0074151 | A1* | 3/2011 | Burra | F03D 9/10 290/44 |
| 2011/0175352 | A1* | 7/2011 | Quottrup | F03D 7/042 290/44 |
| 2011/0187106 | A1* | 8/2011 | Ichinose | F03D 7/047 290/44 |
| 2011/0273129 | A1* | 11/2011 | Coe | G05B 15/02 320/101 |
| 2014/0103652 | A1* | 4/2014 | Ubben | F03D 7/028 290/44 |
| 2014/0103653 | A1* | 4/2014 | Ubben | F03D 7/028 290/44 |
| 2015/0137519 | A1* | 5/2015 | Tarnowski | F03D 9/255 290/44 |
| 2015/0137520 | A1* | 5/2015 | Garcia | F03D 7/0284 290/44 |
| 2016/0164295 | A1* | 6/2016 | Cheng | H02J 3/388 307/22 |
| 2017/0098937 | A1 | 4/2017 | Huomo | |
| 2017/0214244 | A1* | 7/2017 | Dall'Anese | H02J 13/00016 |
| 2017/0244251 | A1* | 8/2017 | Nielsen | H02P 9/04 |
| 2018/0016990 | A1* | 1/2018 | Laskowski | F01D 17/04 |
| 2019/0052083 | A1* | 2/2019 | Lucas, Jr. | H02J 3/46 |
| 2019/0245347 | A1* | 8/2019 | Matamoros | H02H 7/26 |
| 2019/0305346 | A1* | 10/2019 | Berntsen | H01M 8/04753 |
| 2019/0305561 | A1* | 10/2019 | Rosse | H02J 3/38 |
| 2020/0212823 | A1* | 7/2020 | Gong | H02J 3/24 |
| 2020/0259358 | A1* | 8/2020 | Hansen | H01M 10/425 |
| 2020/0389024 | A1* | 12/2020 | Vartanian | H02J 3/241 |
| 2021/0104894 | A1* | 4/2021 | Giorgio | H02J 13/00022 |

FOREIGN PATENT DOCUMENTS

| | | | | |
|---|---|---|---|---|
| CN | 110323789 A | | 10/2019 | |
| EP | 1914420 A1 | | 4/2008 | |
| EP | 3007298 A1 | | 4/2016 | |
| GB | 2510735 A | | 8/2014 | |
| JP | 2002155705 A | * | 5/2002 | G05B 13/02 |
| WO | 2013167140 A1 | | 11/2013 | |
| WO | 2014121794 A1 | | 8/2014 | |
| WO | 2014152706 A2 | | 9/2014 | |
| WO | 2015078470 | | 6/2015 | |
| WO | 2017118460 A1 | | 7/2017 | |

OTHER PUBLICATIONS

European Patent Office, Extended European Search Report for Application 21204621.3-1202 dated Apr. 22, 2022.

* cited by examiner

CONTROLLING POWER DISTRIBUTION AT DEADBAND STATES

TECHNICAL FIELD

The present disclosure relates to a method and power plant controller for noise insensitive control. The method and power plant controller are for controlling one or more wind turbine generators in response to a deviation of an electrical parameter without interference from noise on the received signal.

BACKGROUND

Regulators and operators of power networks expect connected power plants to adhere to a 'grid code' and to provide particular services to the power network.

For example, some operators require power plants to support the power network when the frequency of the power network deviates from the normal operational range, also referred to as a frequency deadband. A range of control strategies have been developed for wind power plants to provide support during frequency deviations. During these events, power plant controllers and wind turbine controllers implement frequency control by changing active power output levels to counteract the frequency deviation. In under-frequency events, where the frequency level deviates below the frequency dead band, active power output levels are increased to control the network frequency. In over-frequency events, where the frequency level rises above the frequency dead band, active power output levels are decreased to provide frequency control.

Conventionally, frequency levels are run through a filter to remove any unwanted noise before the decision is taken on whether there is a frequency deviation. This avoids frequency control being implemented by oscillations in the signal due to noise. However, where fast frequency control is desirable, a filter to remove noises introduces a significant delay in reaction. Some grid codes specifically require a power plant controller to react within a short period after the deviation, and this short period is often exceeded where filtering is applied. Power plants that do not comply with the grid code may be penalised.

It is an aim of the present invention to address one or more of the disadvantages associated with the prior art.

SUMMARY OF THE INVENTION

According to an aspect of the present invention there is provided a method for controlling one or more wind turbine generators. The method comprises: monitoring an electrical parameter of a power network to which the one or more wind turbine generators are connected with respect to a deadband for the electrical parameter and determining that the monitored electrical parameter is deviating outside of the deadband. In response to determining that the monitored electrical parameter is deviating outside of the deadband, the method comprises: quantifying a severity of the deviation; and selectively implementing a parameter control mode when the quantified severity of the deviation is at or above a threshold level. In the parameter control mode, one or more power set points are determined based on the value of the electrical parameter and are dispatched to controllers of the one or more wind turbine generators for controlling the wind turbine generators.

Where the term 'electrical parameter' is used herein, this includes a signal of an electrical parameter, a time series of an electrical parameter, or individual values of an electrical parameter depending on context. For example, monitoring the electrical parameter may comprise monitoring a received signal of an electrical parameter and/or measuring a time series of an electrical parameter. A deviation may be identified on the basis of an individual value of the parameter, so that determining the monitored electrical parameter is deviating outside of the deadband may comprise determining that a value of the electrical parameter is above an upper bound of a deadband range or below a lower bound of a deadband range.

By implementing the method described above, noise insensitive control can be achieved. The method ensures that the control mode, whether it is a voltage control mode, frequency control mode, or otherwise, is triggered in response to a real deviation and is prevented from triggering due to small oscillations caused by noise. In other words, by setting a suitable threshold and quantifying the severity of the deviation according to the threshold, a noisy signal for the electrical parameter can be used to base triggering of a control mode on without causing unnecessary triggering and untriggering of the mode. Accordingly, filtering of the signal can be reduced or removed altogether, and therefore the speed of the reaction of a system to the deviation can be improved. Ordinarily, wind turbines in a wind power plant are controlled to comply with active and reactive power setpoints dispatched by a power plant controller, and a change in these setpoints results in a change in the output of the wind power plant, thereby providing support to the power grid in accordance with the applicable grid code. This improvement in reaction speed leads to a power plant or turbine that complies with particular requirements of grid codes and that is better at supporting power networks during deviations.

The severity of the deviation may be quantified as a function of the duration of the deviation of the electrical parameter outside of the deadband. Alternatively, the severity of the deviation may be quantified as a function of a magnitude of the deviation of the electrical parameter outside of the deadband. Alternatively, the severity of the deviation may be quantified as a function of the duration of the deviation of the electrical parameter outside of the deadband and the magnitude of the deviation of the electrical parameter outside of the deadband.

In other words, the severity of the deviation may be quantified as a function of the duration of the deviation and/or the magnitude of the deviation. The use of duration and/or magnitude to quantify severity may be generally expressed as primarily using a directly measurable variable of the electrical parameter of the power network to quantify severity rather than any derivative value. However, it will be appreciated that the function by which severity is calculated may also, in addition to the duration and/or the magnitude or other directly measurable variable, be quantified using a rate of change of the electrical parameter or another derivative value. In using directly measured values, the severity is provided as an instantaneous measure of the deviation, and so provides much faster control and reaction than seen with filtered signals.

The severity of the deviation may be quantified using a counter whose value increments in response to one or more characteristics of the deviation. The counter may increment in discrete steps. The counter value may be determined based on a previous counter value adjusted by an adjustment value based on one or more characteristics of the deviation. The method may comprise resetting the counter when the electrical parameter returns to the deadband.

The severity of the deviation may be quantified as a function of a gain value. The gain value may be inversely proportional to the range of the deadband.

The severity of the deviation may be quantified as a function of the square of the product of the magnitude of the deviation and the gain value. Alternatively, The severity of the deviation may be quantified as a function of the square of the product of the magnitude of the deviation and the duration of the deviation, and/or the gain value.

The method may comprise applying a filter to the monitored electrical parameter; and implementing a filtered parameter control mode when the quantified severity is below the threshold value. In the filtered parameter control mode, power set points are determined based on the filtered electrical parameter and are dispatched to controllers of the one or more wind turbine generators for controlling the wind turbine generators.

The method may comprise determining a deviation state based on the quantified severity, wherein different deviation states are caused by severities below the threshold and by severities at or above the threshold; and implementing the parameter control mode when the deviation state corresponding to the quantified severity being at or above the threshold is determined.

Determining the deviation state may comprise: determining a first deviation state if the electrical parameter is within the deadband; determining a second deviation state if the electrical parameter is outside of the deadband and the quantified severity is less than the threshold value; and determining a third deviation state if the electrical parameter is outside of the deadband and the severity is at or greater than the threshold value.

The electrical parameter may comprise a frequency level of the power network. Where the electrical parameter comprises a frequency level, the power set points may comprise active power set points. Alternatively, the electrical parameter may comprise a voltage level of the power network. Where the electrical parameter comprises a voltage level, the power set points may comprise reactive power set points.

According to an embodiment of the invention, there is provided power plant controller configured to implement a method as described above. The power plant controller may comprise a state machine and/or a counter, and a frequency controller configured to implement the frequency control mode.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Generally, the method and controller described herein describe an alternative to passing electrical parameters measured from an electrical grid through a filter to remove noise. The method and controller operate to ensure that noise is effectively ignored, thereby providing a noise insensitive control scheme. The insensitivity to noise on the measured signal is achieved by quantifying how severe a deviation of the electrical parameter is from a deadband for that electrical parameter, and only reacting and implementing support or control for that electrical parameter if a particular criteria is fulfilled. Accordingly, delays introduced by filters are avoided without compromising the overall reaction of the system to large deviations. The systems and methods described herein are also agnostic to the source or type of noise and so adequately replicate a filter.

In this discussion, the term 'deadband' is used in its conventional sense a dead zone or a neutral zone that represents a range, or band, of input values relating to a transfer function in a control system where the output of that system is zero, such that no further corrective action occurs. So, if an input signal is varying by a small amount such that it remains within the predetermined deadband established about a setpoint, the associated control system will not take any control action in response to that input signal variability. However, once the input signal goes beyond the value of the deadband, the control system will act on the signal to restore it to the setpoint value. Such deadband regions are typically used in control systems to prevent oscillation or 'hunting'.

For ease of description and to provide a specific example, the method and controller are described below in relation to frequency control and active power supply. However, as demonstrated in the claim set, the method and controller are applicable to any deviation of an electrical parameter of a power network, including but not limited to voltage deviations where reactive power is supplied and absorbed according to whether the deviation is a low-voltage or an over-voltage event. The methodology and structure of the controller when applied to other deviations is the same, although the power type, deviating parameter, dead band range and bounds, and measurement and control equipment are different. Conventional voltage control methodology and controllers and other methods and controllers will be familiar to the skilled person.

Figure 1:
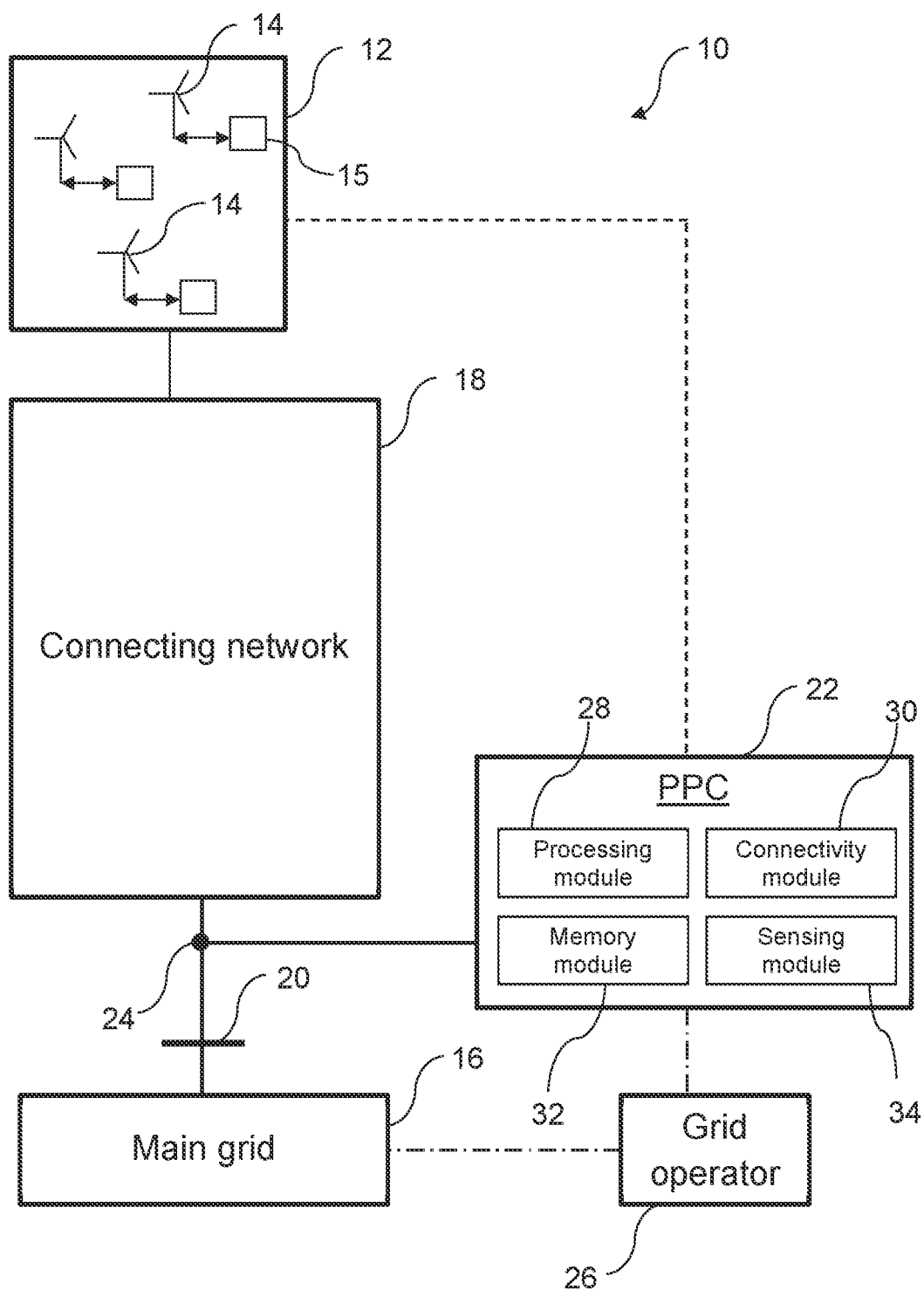
FIG. 1 shows a power network including a wind power plant and a power plant controller.

FIG. 1 illustrates a typical architecture in which a wind power plant (WPP), which may also be referred to as a wind park or wind farm, is connected to a main grid as part of a wider power network. As will be understood by the skilled reader, a WPP comprises at least one wind turbine generator (WTG), and is also known as a wind park or a wind farm. A WTG is commonly referred to as a wind turbine. The examples shown are representative only and the skilled reader will appreciate that other specific architectures are possible, in relation to wind power plants, power plants for other renewable energy sources such as solar power plants, bio energy power plants, or ocean/wave/tidal energy plants, and to hybrid power plants having a combination of different types of renewable energy power plants. Thus, the invention also relates to renewable energy power plants and renewable energy generators in general, rather than being specific to wind power plants and generators as in the Figures. The components of the wind power plant and power network are conventional and as such would be familiar to the skilled reader. It is expected that other known components may be incorporated in addition to or as alternatives to the components shown and described in FIG. 1. Such changes would be within the capabilities of the skilled person.

FIG. 1 shows a power network 10 incorporating a WPP 12 and a power plant controller 22, referred to hereafter as PPC 22. The WPP 12 includes a plurality of WTGs 14. Each of the plurality of WTGs 14 converts wind energy into electrical energy, which is transferred from the WPP 12 to a main transmission network or main grid 16, as active power and/or current, for distribution. Individual generators may each be referred to in this description as a 'unit'. Conventionally the WPP 12 includes the power plant controller 22 located within its geographical vicinity.

Although not illustrated in this Figure, the WPP 12 may also include compensation equipment, such as a static synchronous compensator (STATCOM) or another type of synchronous compensator, configured to provide reactive power or reactive current support as required. The WPP 12 may also include a battery energy storage system.

Each of the WTGs 14 is associated with a respective WTG controller 15. In some examples, a set of WTGs may share a single, semi-centralised WTG controller, such that there are fewer WTG controllers than WTGs. As would be understood by the skilled person, WTG controllers 15 can be considered to be computer systems capable of operating a WTG 14 in the manner prescribed herein, and may comprise multiple modules that control individual components of the WTG or just a single controller. The computer system of the WTG controller 15 may operate according to software downloaded via a communications network or programmed onto it from a computer-readable storage medium.

During normal operation of the WPP 12, the WTG controllers 15 operate to implement active and reactive current and/or power requests received from the PPC 22 to provide frequency and voltage support to the main grid 16. During extraordinary conditions, the WTG controllers 15 operate to fulfil predetermined network requirements, and also act to protect the WTGs 14 from any potentially harmful conditions.

The WPP 12 is connected to the main grid 16 (also called the main power network) by a connecting network 18. The WPP 12 and the main grid 16 are connected at a Point of Interconnection (PoI) 20, which is an interface between the WPP 12 and the main grid 16. The PoI 20 may also be referred to as the Point of Common Connection, which may be abbreviated to 'PCC' or 'PoCC'.

The Power Plant Controller (PPC) 22 is connected to a Point of Measurement (PoM) 24 and is also connected to the WTG controllers 15. By virtue of its connection to the PoM 24, the PPC 22 is able to measure electrical characteristics of the main grid at the PoI 20. The role of the PPC 22 is to act as a command and control interface between the WPP 12 and the grid 16, and more specifically, between the WPP 12 and a grid operator 26, such as a transmission system operator (TSO) or a distribution system operator (DSO). The PPC 22 is a suitable computer system for carrying out the controls and commands as described above and so incorporates a processing module 28, a connectivity module 30, a memory module 32 and a sensing module 34. The PPC 22 may also receive information regarding the grid 16 and/or the local buses, substations and networks from an energy management system (not shown). The WPP 12 is capable of altering its power or current output in reaction to commands received from the PPC 22.

As part of its operation, the PPC 22 generates and sends dispatch signals to the WTG controllers 15. The WTG controllers 15 control the WTGs according to set points contained within the dispatch signals.

The PPC 22 acts to operate the WTGs 14 to provide frequency support to the grid 16 where frequency deviates from an acceptable frequency range, also known as a frequency deadband. To provide frequency support, the PPC 22 issues dispatch signals configured to cause the WTGs 14 to increase or decrease active power supply to provide frequency support to the power network. The signals are determined to control the active power output of the WTGs 14 so that frequency levels are supported in returning to the deadband. The deadband is generally a small region around the operating frequency of the power network, typically 50 Hz, or in some examples, 60 Hz, as measured at the PoI 20 or PoM 24.

When the frequency deviation drops below the deadband, the PPC 22 provides frequency support by dispatching increased active power set points to the WTGs 14. When frequency levels rises above deadband, the PPC 22 provides frequency support by dispatching decreased active power set points. These are under- and over-frequency events respectively.

In conventional operation, the measurements for electrical parameters, including frequency level and voltage level, are received as unfiltered signals or time series. Accordingly, the measurements may include noise on the signal due to one or more external circumstances; the noise may be introduced by the measurement equipment, due to the strength of the grid, or the signal may be inherently noisy. In conventional systems, unfiltered signals are passed through a filter to remove excess noise. Otherwise, if an unfiltered measurement is used in a conventional system to make the decision on whether a deviation of the electrical parameter has occurred, noise on the signal causing oscillations in the signal may cause unwanted cyclic triggering of the controller as the electrical parameter level wavers between being outside of its deadband and within its deadband.

However, where grid codes specify that fast reaction to frequency deviation is required, for example within 2 seconds, passing the frequency level through a filter may result in a reaction to a frequency deviation that is slower than the specified reaction time.

Accordingly, the inventors have identified a method and controller for controlling one or more wind turbine generators to prevent cyclic triggering of a control mode for counteracting a deviation of an electrical parameter, typically frequency, by reducing the impact of noise on the signal whilst enabling a fast reaction to the frequency event to be implemented. Particularly, the method and controller described herein operate to quantify the frequency deviation according to one or more characteristics, and if the quantification indicates that the deviation is above a certain threshold, to implement frequency control. In doing so, true frequency events, in which a significant and comparably lengthy deviation is identified, are distinguished from false frequency events, in which noise or oscillations cause the frequency level to be outside the deadband. Effectively, the method and controller described herein acts as a fast-acting filter to remove unwanted noise while ensuring compliance with grid codes. While the intention is to apply the method to unfiltered signals, the method may be applied to any signal such as a signal that has been roughly filtered or a filtered signal and with a variable sensitivity to enable further noise removal as desired.

Figure 2:
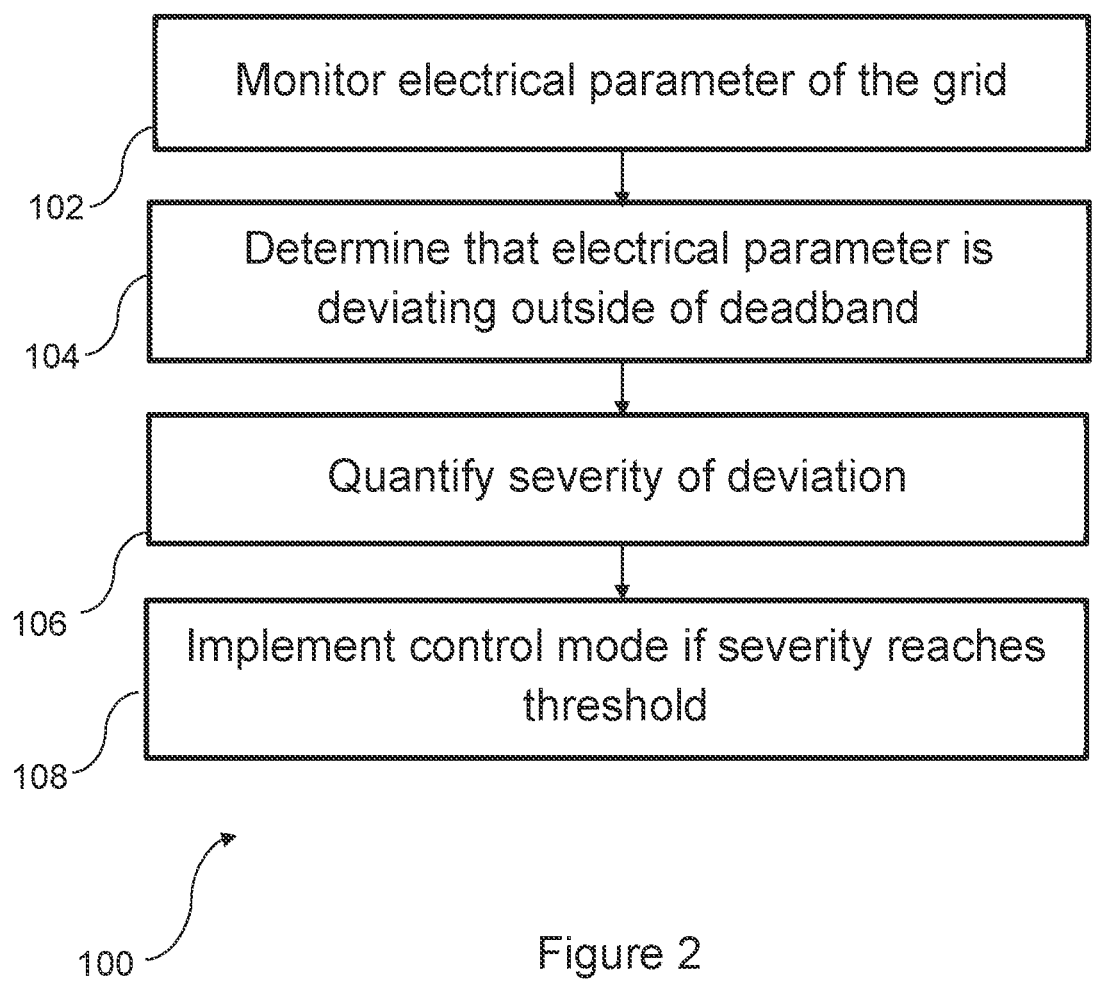
FIG. 2 shows a method according to an embodiment of the invention.

The method 100 is generally depicted in FIG. 2, and is typically performed by a power plant controller, although other controllers such as a local wind turbine controller may also perform the method.

As can be seen in FIG. 2, the method 100 includes the step 102 of monitoring the electrical parameter, which in the examples described below is the frequency level of the grid. The monitoring step 102 is performed with respect to a deadband of the electrical parameter, which is a range of allowable values of the electrical parameter between an upper and lower bound. When the electrical parameter is within the deadband, the power plant controller typically controls the turbines of the power plant according to a power reference or set point to meet demands or requests from the operator.

When it is determined, at step 104, that the electrical parameter has deviated outside of the deadband, the steps 106 and 108 are performed in response. Deviation comprises the value of the electrical parameter as monitored in step 102 being outside of, i.e. above the upper bound or below the lower bound, the deadband.

At step 106, in response to the deviation, the severity of the deviation is quantified. The severity may be quantified in one of a number of ways, as will be described below. The severity as used herein is a measure of the deviation to establish whether it is a true deviation and should be acted upon or whether it is a deviation caused by oscillations or noise on the signal and therefore should not be acted upon. A more severe deviation corresponds to one that requires action, and by setting particular thresholds for the severity, different amounts of noise can be effectively ignored or 'filtered' from the signal.

At step 108, if the severity reaches a threshold value, a control mode is entered in which power set points are determined and dispatched, based on value of the electrical parameter, so that support can be provided to reduce the severity of the deviation and to help return the electrical parameter to the deadband.

At step 102, if no determination is made that the electrical parameter is outside of the deadband then monitoring continues. Similarly, if it is determined that the severity as quantified at that moment in time has not yet reached the threshold, the severity of the deviation is quantified again until the severity threshold is reached.

The severity may be quantified in a number of ways. It will be appreciated that the measurement and quantification of the severity and the level at which the threshold for the control mode is set are linked, and so the function used to determine the severity and the value of the threshold are set together.

In some embodiments, the severity is based on the duration of the deviation. The duration is the length of time for which the parameter has been outside of the deadband without returning to it. The duration may be measured by a timer or by a counter having an incrementing value that is related to the duration. In embodiments where the severity is quantified as the duration of the deviation directly, the threshold is a period of time during which the parameter has to stay outside of the deadband without returning to the deadband before action is taken. In other embodiments, the severity is based on the duration and one or more other measures, as described below.

In some embodiments, the severity is based on the magnitude of the deviation. The magnitude of the deviation is the size of the error between the value of the deviating parameter and the threshold against which it is being compared, i.e. the deadband upper or lower bound. In these embodiments, a dual control may be implemented when the parameter is outside of the deadband. In this dual control, a threshold may be implemented that indicates a level above which a first parameter control mode is implemented, and below which a second parameter control mode is implemented, so long as the deviation is outside of the deadband. In this embodiment, the quantified severity, which may be the magnitude alone or a function of the magnitude, is compared with the threshold and the parameter control mode implemented based on the unfiltered signal if the severity is above the threshold. If the severity is below the threshold, a filtered control mode is implemented in which power set points are determined and dispatched based on a filtered signal of the parameter. Accordingly, the method in these embodiments also includes applying a filter to the signal of the electrical parameter so that two signals exist for the electrical parameter: an unfiltered signal and a filtered signal.

Figure 3:
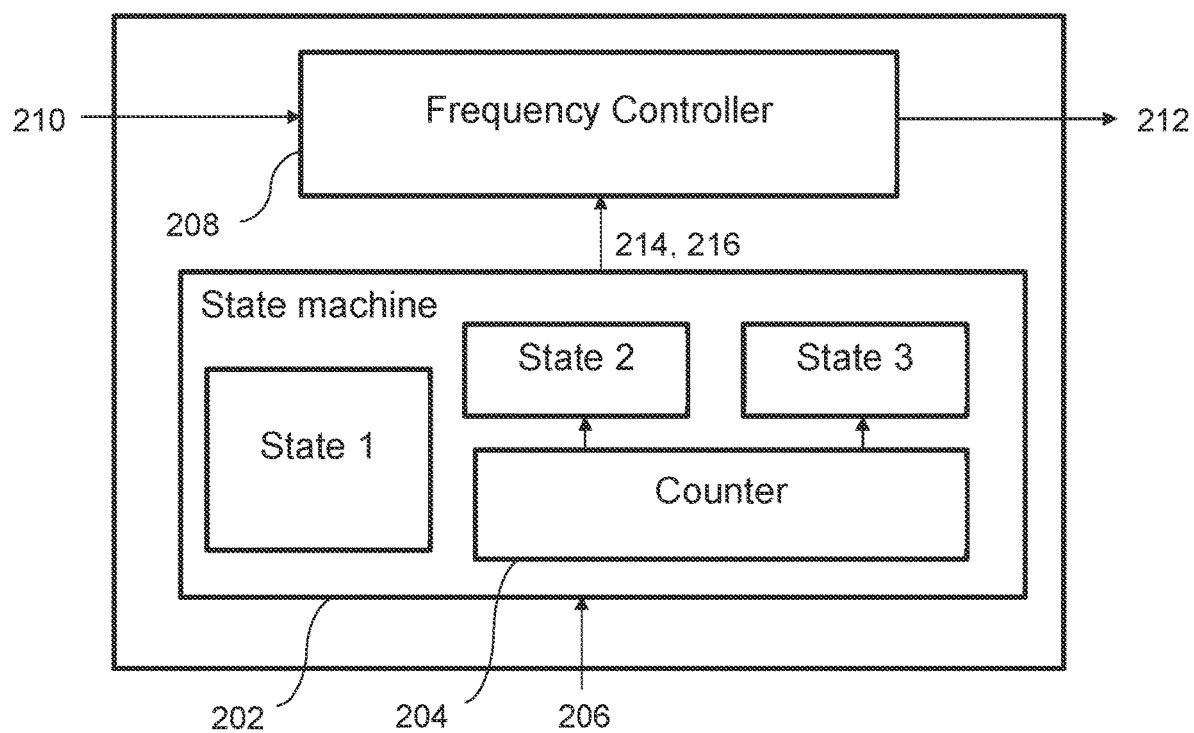
FIG. 3 shows a controller according to an embodiment of the invention.

In some embodiments, the severity is a function of both the magnitude and duration of the deviation. A particular embodiment is used in the example provided in FIG. 4 to demonstrate the implementation of the method. In this embodiment, a counter is utilised. The counter is configured to increment its value in response to the magnitude and duration of the deviation. The counter is connected with a state machine, whose state dictates when the counter value is above the threshold required to implement the frequency control mode. An example of a controller 200 including a state machine and the counter is shown in FIG. 3. The controller 200 is configured to implement the method 100 above, and may be incorporated into a power plant controller. Parts of the method may be performed elsewhere within the power plant's control systems, such as at the SCADA system.

In FIG. 3, the controller 200 comprises the state machine 202 which incorporates the counter 204 therein. In other embodiments, the counter 204 and state machine 202 may be separate. The state machine 202 is configured to receive measurements 206 relating to the monitored frequency level. Measurements may be received from sensors at the PoI or from elsewhere. In particular, as described above, the state machine is configured to receive the unfiltered frequency signal measured at the PoI and to compare it with the deadband range. The state machine is configured to change its state depending upon whether a deviation is taking place and depending upon the value of the counter.

The state machine 202 is connected to a frequency controller 208. The state machine 202 controls the action of the frequency controller 208, indicating when the frequency controller 208 should be activated to implement the frequency control mode. The frequency controller 208 is configured to receive a measured frequency signal and a frequency reference signal as inputs 210 and to determine and dispatch active power set points corresponding to the magnitude of the deviation as outputs 212. Frequency control and the determination of set points by a frequency controller in a frequency control mode will be familiar to the skilled person.

During operation of the controller 200 of FIG. 3, the state machine 202 is in a first state, State 1 in FIGS. 3 and 4, when the frequency level is within the deadband. The state machine performs comparisons between the measured frequency and the deadband to determine when a deviation occurs. In response to a deviation being detected, the state machine moves from State 1 to a second state, here labelled State 2. In State 2, the counter begins counting. Accordingly, State 1 can be considered to indicate that no counting is taking place and that the frequency is within the deadband. The second state indicates that counting is taking place because the frequency is outside of the deadband but that the threshold for the severity as indicated by the counter value has not yet been reached. Once the counter value reaches the threshold, the state of the state machine changes from State 2 to a third state, State 3. The third state indicates that the threshold has been reached, and the state machine entering this mode is communicated as a trigger to the frequency controller to enter the frequency control mode. In other embodiments, the frequency controller may form part of a wider processor, and the trigger received from the state machine indicating that state three has been entered may be utilised to switch to the frequency control mode.

If, at any point the frequency returns to the deadband, the state machine changes back to State 1 and the counter is reset to zero.

Changes from State 2 to State 3 cause an activating trigger signal 214 to be sent from the state machine 202 to the frequency controller 208 to implement the frequency control mode and changes from state 3 back to state 1 also cause a deactivating trigger signal 216 to be sent to the controller to cause it to deactivate and to stop implementing the frequency control mode. Outside of the frequency control mode, the PPC implements set points received from other controllers or received as commands from an operator.

The way in which the state machine 202 implements each state depends upon how the state machine is configured. In some embodiments, the states may be indicated using mutually exclusive flags or the value of another counter. The state machine 202 may have different modules that are arranged so that a check is performed for each state in turn and wherein each module is configured to output a signal to indicate that that particular state is active. In general, it will be appreciated that the diagram of FIG. 3 is a high-level schematic and so is intended to demonstrate the principle only, rather than any specific architecture. In general, state machine configuration is well-known to the skilled person, so no further specific discussion about the state machine will be provided, because its proposed functionality is clear from the foregoing description.

The counter in the present embodiment operates according to the following formula dictating the value of the count at time t:

$$\text{count}(t)=\text{count}(t-1)+(\text{Ferror}(t)*\text{Gain})^m$$

Where count(t−1) is the value of the count at the previous time point, Ferror(t) is the error in the frequency value calculated as the difference between the measured frequency at time t and the exceeded deadband boundary, and gain is a gain function configured to ensure that the counter reaches its maximum value in a predetermined time period, depending on the size of Ferror. In effect, therefore, the counter rate is controlled by the gain function. The gain value is calculated such that a particular duration and/or magnitude value for the deviation causes the counter to reach its threshold value. The gain function in the present embodiment is calculated according to the following formula:

$$\text{Gain}=1/(n*DB)$$

where DB is the range of the deadband and n is a variable value to permit fine-tuning of the counting. In the example of FIG. 4, the value of n is 3. Note that the values m and n may be user-settle variables in order to the system to be tuned as required for the specific application.

In general, the value of the counter is a measure of the severity of the deviation. The higher the counter value, the more severe the deviation is considered to be. The use of both a duration and an error value enable it to be responsive to large deviations in a short time scale and small deviations over a longer time scale while disregarding small, transient deviations. The counter value and the rate at which it increases depending on the duration and magnitude of the deviation may be varied to enable a different reaction to different errors. In the above example, the gain value is used to tailor the relationship between duration and magnitude to ensure that the variation and change in the counter value is at a desired level. In other words, the counter can be configured to mimic the action of a filter by disregarding different sizes of deviation or different durations of deviation.

Figure 4A:
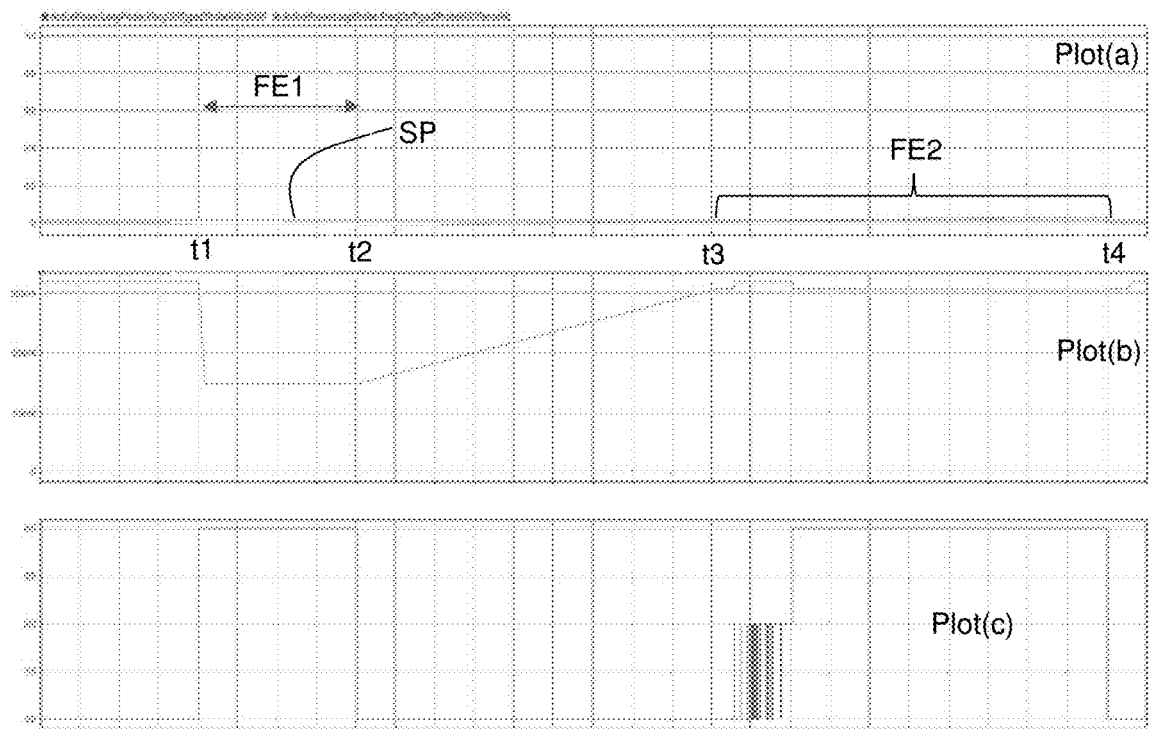
FIGS. 4a and 4b show charts depicting exemplary frequency deviations and the reaction to them according to the method of FIG. 2.
Figure 4B:
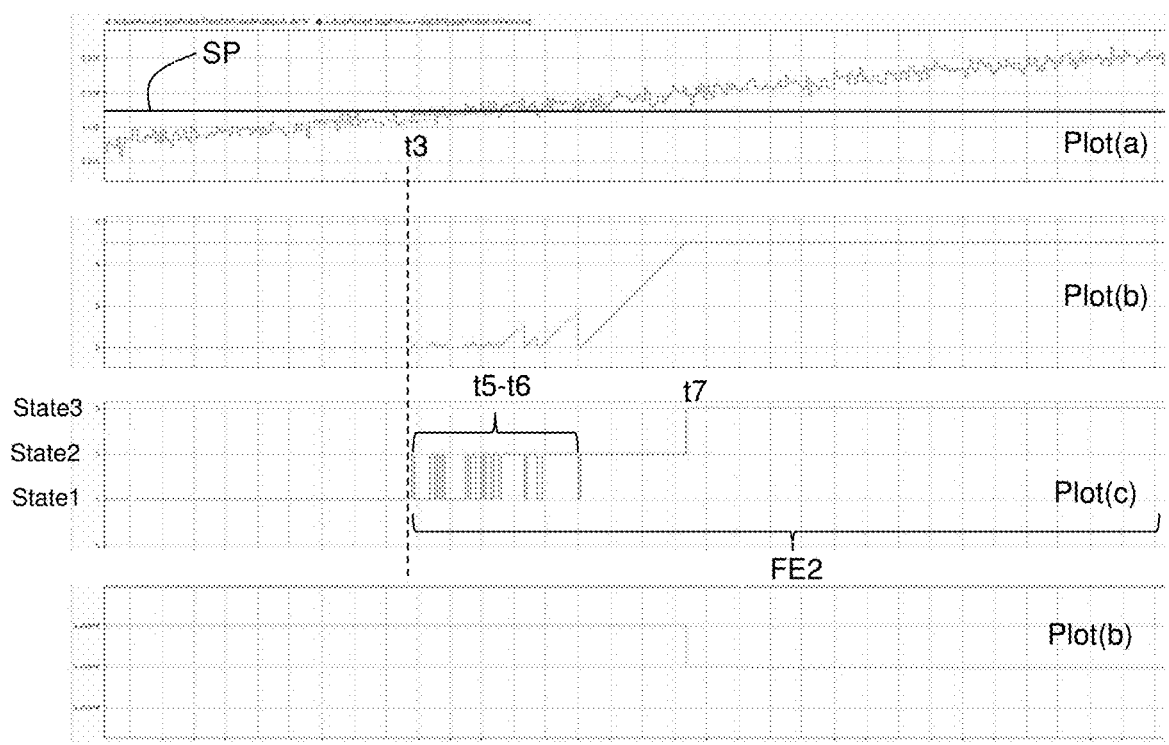

FIGS. 4a and 4b each show a set of plots or charts illustrating an exemplary scenario in which the method of FIG. 2 and the controller of FIG. 3 are used and their reaction. FIG. 4a shows the full time series for the example, while FIG. 4b shows a portion of the time series of FIG. 4a centred around a specific part of the time series. The charts comprise at least a frequency time series, an active power set point time series, and a time series illustrating the states of the state machine.

In FIG. 4a, two different frequency events occur, and these are shown through three different plots, labelled Plot (a), Plot (b), and Plot(c). Plot (a) shows the grid frequency, compared to a setpoint line (labelled SP), Plot (b) shows the active power level in response to the frequency events, and Plot (c) shows the counter state. The first frequency event occurs between t1 and t2 seconds, and is an over frequency event in which the upper bound of the frequency deadband is exceeded. The first frequency event is labelled as FE1 on FIG. 4a. This deviation has a high magnitude, so the state machine immediately moves to State 3 because the Ferror indicated is very high causing the counter to reach its threshold level very quickly. State 3 is maintained until the frequency level returns to the deadband at approximately 40 seconds. In this time, the active power reference is reduced to the appropriate level, taking into account the relevant ramp rates, as the frequency controller implements its frequency control mode in reaction to the state being at State 3.

The first frequency event demonstrates one of the benefits of the method of FIG. 2—that the system still reacts to true frequency events with big deviations without delay. In other words, the method and system act to replace only the filter and its delay without disrupting any other systems or operation of the frequency controller and the PPC.

After the first frequency event, the active power set points increase back to pre-deviation levels according to a predetermined ramp rate.

The second frequency event occurs between approximately t3 seconds and t4 seconds, which is labelled FE2 on FIG. 4a, and which is shown in detail in FIG. 4b. This second frequency event, in contrast to the first, is a slow rise in the frequency level rather than an instant, large deviation. Over the course of the event, the frequency level increases to outside of the deadband. In FIG. 4b, plot 9(a) shows the frequency rising above the setpoint upper bound (SP) slowly, that signal being affected by noise; plot(b) shows the incrementing counter, plot(c) shows the state of the counter (State 1, 2 or 3), and plot(d) shows the active power control action response.

Due to noise in the frequency signal, as can be seen in FIG. 4b, between t5 and t6 seconds the frequency level oscillates between above and below the deadband upper bound, which is shown as SP. During this period, when the frequency level deviates outside the upper bound, the state machine shifts to State 2, as can be seen in plot(c). When the frequency level oscillates back to below the upper bound, the state of the state machine returns to State 1. Only when the frequency level has exceeded the upper bound for an extended period of time does the state move to State 3, and at this point, at approximately t7 seconds, the active power set point becomes responsive to the frequency level as the frequency control mode is implemented.

Accordingly, it can be seen that by reacting to the severity of the deviation, the method and system described herein effectively acts as a filter for the unfiltered signal. When the frequency signal is oscillating around the deadband bound, the method and system prevent triggering of the frequency control mode. In contrast, when sustained and/or large deviation occurs, the method and system act to implement the frequency control mode in which frequency control is applied using active power set points based on the frequency level. The result is a method and system that reacts much faster to frequency deviations, as can be seen in the first frequency event, where the active power set point or reference reduces to its frequency-dependent level in less than two seconds. Had the system incorporated a filter, then this reaction would have been slower as the delay introduced by the filter prevented reaction until the frequency event had been sustained for some time.

The reactions as demonstrated above in reaction to an over-frequency event would be replicated by the method and systems in response to an under-frequency event.

It will be appreciated that various changes and modifications can be made to the present invention without departing from the scope of the present application.

The invention claimed is:

1. A method for controlling one or more wind turbine generators, the method comprising:
monitoring an electrical parameter of a power network to which the one or more wind turbine generators are connected with respect to a deadband for the electrical parameter;
determining a first deviation state when the electrical parameter is within the deadband;
determining a second deviation state when the electrical parameter is outside of the deadband and a quantified severity of a deviation of the electrical parameter outside of the deadband is less than a threshold value;
determining a third deviation state when the electrical parameter is outside of the deadband and the quantified severity is at or greater than the threshold value; and
selectively implementing a parameter control mode for the third deviation state when the electrical parameter is outside of the deadband and the severity is at or greater than the threshold value, wherein in the parameter control mode, one or more power set points are determined based on a value of the electrical parameter and are dispatched to controllers of the one or more wind turbine generators for controlling the wind turbine generators.

2. The method of claim 1, wherein the severity is quantified as a function of a duration of the deviation of the electrical parameter outside of the deadband.

3. The method of claim 2, wherein the severity is quantified as a function of a gain value.

4. The method of claim 3, wherein the gain value is inversely proportional to a range of the deadband.

5. The method of claim 3, wherein the severity is quantified as a function of an exponent of a product of a magnitude of the deviation, and the gain value.

6. The method of claim 1, wherein the severity is quantified as a function of a magnitude of the deviation of the electrical parameter outside of the deadband.

7. The method of claim 1, wherein the severity is quantified as a function of a duration of the deviation of the electrical parameter outside of the deadband and a magnitude of the deviation of the electrical parameter outside of the deadband.

8. The method of claim 7, wherein the severity is quantified using a counter whose value increments in response to one or more characteristics of the deviation.

9. The method of claim 8, wherein the counter value is determined based on a previous counter value adjusted by an adjustment value based on one or more characteristics of the deviation.

10. The method of claim 7, comprising resetting the counter when the electrical parameter returns to the deadband.

11. The method of claim 1, comprising:
applying a filter to the monitored electrical parameter; and
implementing a filtered parameter control mode when the quantified severity is below the threshold value, wherein in the filtered parameter control mode power set points are determined based on the filtered electrical parameter and are dispatched to controllers of the one or more wind turbine generators for controlling the wind turbine generators.

12. The method of claim 1, wherein the electrical parameter comprises a frequency level of the power network.

13. A power plant controller, comprising:
an I/O interface configured for communication with one or more wind turbine generators;
a memory containing instructions;
at least one processor which, when programmed with the instructions, is configured to perform an operation for controlling the one or more wind turbine generators, the operation comprising:
monitoring an electrical parameter of a power network to which the one or more wind turbine generators are connected with respect to a deadband for the electrical parameter;
determining a first deviation state when the electrical parameter is within the deadband;
determining a second deviation state when the electrical parameter is outside of the deadband and a quantified severity of a deviation of the electrical parameter outside of the deadband is less than a threshold value;
determining a third deviation state when the electrical parameter is outside of the deadband and the quantified severity is at or greater than the threshold value; and
selectively implementing a parameter control mode for the third deviation state when the electrical parameter is outside of the deadband and the severity is at or greater than the threshold value, wherein in the parameter control mode, one or more power set points are determined based on a value of the electrical parameter and are dispatched to controllers of the one or more wind turbine generators for controlling the wind turbine generators.

* * * * *